United States Patent
Morgan et al.

(10) Patent No.: US 8,282,127 B1
(45) Date of Patent: Oct. 9, 2012

(54) GAS GENERATING SYSTEM

(75) Inventors: Richard W. Morgan, Washington, MI (US); Eduardo L. Quioc, Westland, MI (US)

(73) Assignee: TK Holdings, Inc., Armada, MI (US)

( * ) Notice: Subject to any disclaimer, the term of this patent is extended or adjusted under 35 U.S.C. 154(b) by 196 days.

(21) Appl. No.: 12/584,369

(22) Filed: Sep. 3, 2009

Related U.S. Application Data

(60) Provisional application No. 61/190,826, filed on Sep. 3, 2008.

(51) Int. Cl.
  *B60R 21/26* (2011.01)
  *B60R 21/263* (2011.01)
  *B60R 21/264* (2006.01)
  *C06D 5/00* (2006.01)

(52) U.S. Cl. ............... 280/736; 102/202.5; 102/530; 280/741; 280/742

(58) Field of Classification Search .......... 280/736, 280/737, 740, 741, 742; 102/530, 531, 202, 102/202.5, 202.12, 202.14
See application file for complete search history.

(56) References Cited

U.S. PATENT DOCUMENTS

| | | | |
|---|---|---|---|
| 6,149,193 A * | 11/2000 | Canterberry et al. | 280/741 |
| 6,189,924 B1 | 2/2001 | Hock | 280/736 |
| 6,460,884 B1 * | 10/2002 | Nakashima et al. | 280/741 |
| 6,648,370 B2 * | 11/2003 | Koga et al. | 280/736 |
| 6,659,500 B2 | 12/2003 | Whang et al. | 280/741 |
| 6,669,230 B1 * | 12/2003 | Nakashima et al. | 280/735 |
| 6,709,012 B1 * | 3/2004 | Tanaka et al. | 280/736 |
| 6,764,096 B2 | 7/2004 | Quioc | 280/736 |
| 6,886,856 B2 * | 5/2005 | Canterberry et al. | 280/741 |
| 6,913,284 B2 * | 7/2005 | Haeuslmeier et al. | 280/735 |
| 6,983,956 B2 * | 1/2006 | Canterberry et al. | 280/741 |
| 6,997,477 B2 | 2/2006 | Quioc | 280/741 |
| 7,017,944 B2 | 3/2006 | Edwards, II et al. | 280/737 |
| 7,044,502 B2 * | 5/2006 | Trevillyan et al. | 280/741 |
| 7,055,855 B2 * | 6/2006 | Nakashima et al. | 280/736 |
| 7,192,051 B2 * | 3/2007 | Takahara | 280/736 |
| 7,325,828 B2 * | 2/2008 | Matsuda | 280/736 |
| 2006/0091659 A1 * | 5/2006 | Matsuda | 280/736 |

* cited by examiner

*Primary Examiner* — Joseph Rocca
(74) *Attorney, Agent, or Firm* — L.C. Begin & Associates, PLLC.

(57) ABSTRACT

A gas generating system including a housing and a divider dividing an interior of the housing into a first chamber and a second chamber. First and second tubes extend into the second chamber and end at the divider. At least one opening is formed in the divider to enable fluid communication of the first chamber with an interior of only the first tube after activation of the gas generating system.

20 Claims, 2 Drawing Sheets

US 8,282,127 B1

GAS GENERATING SYSTEM

CROSS-REFERENCE TO RELATED APPLICATION

This application is entitled to and claims the benefit of Provisional Patent Application Ser. No. 61/190,826, filed on Sep. 3, 2008.

BACKGROUND OF THE INVENTION

The present invention relates to gas generating systems usable for generating gases for activating gas-actuated devices.

SUMMARY OF THE INVENTION

In one aspect of embodiments of the present invention, a gas generating system is provided including a housing and a divider dividing an interior of the housing into a first chamber and a second chamber. First and second tubes extend into the second chamber and end at the divider. At least one opening is formed in the divider to enable fluid communication of the first chamber with an interior of only the first tube after activation of the gas generating system.

In another aspect of embodiments of the present invention, a gas generating system is provided including a housing defining a housing interior, and a divider dividing the housing interior into a first chamber and a second chamber. First and second igniter tubes extend into the housing interior and end at the divider. A first igniter is positioned in the first igniter tube and is operatively coupled to the first chamber for initiating combustion of a gas generant only in the first chamber. A second igniter is positioned in the second igniter tube and is operatively coupled to the second chamber for initiating combustion of a gas generant only in the second chamber.

DETAILED DESCRIPTION

Figure 1:
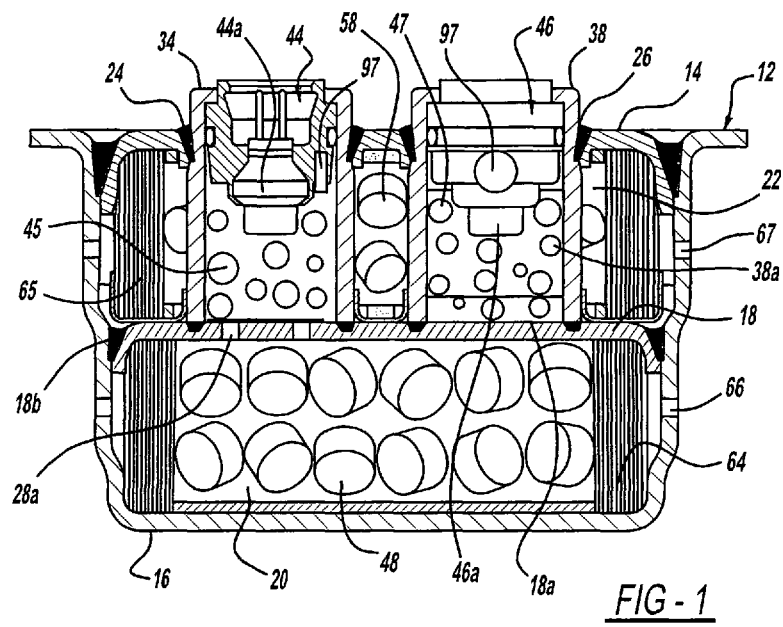
FIG. 1 is a side cross-sectional view of a gas generating system in accordance with an embodiment of the present invention.

Referring to FIG. 1, a gas generating system in accordance in one embodiment of the present invention includes a housing 12 and a divider 18 dividing an interior of the housing into a first chamber 20 on a first side of the divider and a second chamber 22 on a second side of the divider opposite the first side. A first tube 34 and a second tube 38 extend into the second chamber 22 and end at the divider 18. At least one opening 28a is formed in the divider 18 to enable fluid communication of the first chamber 20 with an interior of only the first tube 34 after activation of the gas generating system.

Housing 12 is formed from a first housing portion 14 and a second housing portion 16 operatively coupled to the first housing portion to define the housing interior. In the embodiment shown in FIG. 1, first housing portion 14 is a base and second housing portion 16 is a cap. Base 14 is welded or otherwise fixed to cap 16 so as to form a substantially gas-tight seal therebetween. Base 14 and cap 16 may be formed by casting, stamping, or any other suitable method from a metal, metal alloy, or other suitable material. The base 14 contains a first opening 24 and a second opening 26. Cap 16 has one or more first gas exit openings 66 formed along a first portion of the cap, and one or more second gas exit openings 67 formed along a second portion of the cap. First gas exit openings 66 are positioned so as to enable fluid communication between a first chamber 20 (described below) of the gas generating system and an exterior of the gas generating system. Second gas exit openings 67 are positioned so as to enable fluid communication between a second chamber 22 (described below) of the gas generating system and an exterior of the gas generating system.

In the embodiment shown in FIG. 1, divider 18 divides an interior of the housing 12 into a first chamber 20 and a second chamber 22. Divider 18 includes a base portion 18a, a rim portion 18b extending around a periphery of the base portion, and one or more openings 28a extending through the base portion to enable fluid communication between opposite sides of the divider. Opening(s) 28a are formed in a location on divider 18 such that the opening is substantially in alignment with base first opening 24 when base 14 is fixed to cap 16. Rim portion 18b is welded or otherwise attached to an inner wall of base 16 so as to form a substantially gas-tight seal therebetween, to prevent fluid communication between first chamber 20 and second chamber 22. Divider 18 may be formed by casting, stamping, or any other suitable method from a metal, metal alloy, or other suitable material.

In the embodiment shown in FIG. 1, divider 18 is a single substantially planar plate or member spanning an inner diameter or dimension of cap 16. However, the divider may have any of a variety of alternative configurations depending on the requirements of a particular application.

In the embodiment shown in FIG. 1, first tube 34 extends into base first opening 24. Tube 34 has an outer diameter or other peripheral shape configured to substantially conform to the shape and dimensions of opening 24, thereby enabling welding or other suitable attachment of the tube to edge portions of the opening so as to form a substantially gas-tight seal therebetween. An end portion of tube 34 is also welded or otherwise suitably attached to divider 18 so as to form a substantially gas-tight seal therebetween. As seen in FIG. 1, the end portion of the tube encloses openings 28a when the end portion is positioned and attached to divider 18.

In the embodiment shown in FIG. 1, second tube 38 extends into base second opening 26. Tube 38 has an outer diameter or other peripheral shape configured to substantially conform to the shape and dimensions of opening 26, thereby enabling welding or other suitable attachment of the tube to edge portions of the opening so as to form a substantially gas-tight seal therebetween. An end portion of tube 38 is also welded or otherwise suitably attached to divider 18 so as to form a substantially gas-tight seal therebetween. As seen in FIG. 1, one or more openings 38a are formed in a wall of the tube to enable fluid communication between an interior of the tube and an exterior of the tube. In the embodiment shown, at least one opening 38a is formed in second tube 38 to enable fluid communication of second chamber 22 with an interior of only the second tube 38 after activation of the gas generating system. Also, in the embodiment shown, first and second tubes 34 and 38 extend into the housing from the first housing portion 14 to the divider 18.

In one embodiment, tube 38 is made from a material that will not transfer sufficient heat therethrough to conductively ignite gas generant material 58 in second chamber 22. Alternatively, tube 38 may be insulated to prevent transfer of sufficient heat to the gas generant to produce ignition.

In the embodiment shown in FIG. 1, a first igniter assembly 44 is secured at an end of second tube 34 so as to form a substantially gas-tight seal between the first tube and the igniter assembly, as known in the art. Igniter assembly 44 includes an igniter 44a positioned so as to ignite a booster material 45 (or alternatively, a gas generant material (not shown)) positioned within first tube 34.

In the embodiment shown in FIG. 1, a second igniter assembly 46 is secured at an end of second tube 38 so as to form a substantially gas-tight seal between the second tube and the igniter assembly. Igniter assembly 46 includes an igniter 46a positioned so as to ignite a booster material 47 (or alternatively, a gas generant material (not shown)) positioned within second tube 38.

Igniter assemblies suitable for the application described herein may be obtained from any of a variety of known sources, for example Aerospace Propulsion Products by, of The Netherlands. Igniter 44a may be formed as known in the art. Exemplary igniter constructions are described in U.S. Pat. Nos. 6,009,809 and 5,934,705, incorporated herein by reference. The igniters may be secured within their respective igniter assemblies by any of a variety of methods, for instance using welds, adhesives, by crimping, or by integrally molding the igniter into a portion of a respective igniter assembly.

Referring again to FIG. 1, a quantity of an ignition compound 45 (or, alternatively, as gas generant material (not shown)) may be positioned within first tube 34. In the embodiment shown in FIG. 1, ignition compound 45 is a known or suitable ignition or booster compound, whose combustion ignites gas generant 48 positioned in first chamber 20. One or more autoignition tablets (not shown) may be placed in first tube 34 to facilitate ignition of ignition compound 45 upon external heating of housing 12, in a manner well-known in the art.

Referring again to FIG. 1, a quantity of an ignition compound 47 (or alternatively, as gas generant material (not shown)) may be positioned within second tube 38. In the embodiment shown in FIG. 1, ignition compound 47 is a known or suitable ignition or booster compound, whose combustion ignites gas generant 58 positioned in second chamber 22. One or more autoignition tablets (not shown) may be placed in second tube 38 to facilitate ignition of ignition compound 47 upon external heating of housing 12, in a manner well-known in the art. In the embodiment shown in FIG. 1, gas generant material 58 in second chamber 22 is positioned in the second chamber exterior of both the first and second tubes 34 and 38. In this embodiment, it is also seen that gas generant material 58 surrounds both the first and second tubes.

A gas generant material 48 is positioned within first chamber 20, and a gas generant material 58 is positioned within second chamber 22. Gas generant materials 48 and 58 may have the same composition or different compositions. Materials 48 and 58 may comprise any gas generant compositions (or composition) known for their utility in vehicle occupant protection systems. Co-owned U.S. Pat. Nos. 5,035,757, 5,756,929, 5,872,329, 6,077,371, 6,074,502, and 6,210,505 are incorporated herein by reference and exemplify, but do not limit gas generant compositions contemplated in accordance with the present invention.

If desired, the composition of any gas generant material used in an embodiment of the present invention may be selected so as to facilitate an extended burning time of the material. Similarly, the structural features of the gas generating system may also be positioned and/or dimensioned to promote extended burning time of the material.

In the embodiment shown in FIG. 1, rupturable, fluid-tight seals are positioned to seal first and second gas exit openings 66 and 67 and divider openings 28a prior to activation of the gas generating system. Various disks, foils, films, etc. may be used to form the seals, depending on the desired performance characteristics of the gas generating system and other factors. For example, disks made from materials and/or having structures which are relatively more or less readily ruptured may be used.

A first annular filter 64 is interposed between gas generant material 48 and gas exit openings 66, for filtering particulates and/or cooling gasses generated by combustion of gas generant material 48. A second annular filter 65 is interposed between gas generant material 58 and gas exit openings 67, for filtering particulates and/or cooling gasses generated by combustion of gas generant material 58. Any suitable metallic mesh filter or woven wire cloth may be used, many examples of which are known and obtainable from commercially available sources (for example, Wayne Wire Cloth Products, Inc. of Bingham Farms, Mich.) Other suitable materials may also be used for the filters.

Operation of the gas generator will now be discussed with reference to FIG. 1. Generally, initiation of combustion of gas generant material 48 positioned in first chamber 20 and/or gas generant material 58 positioned in second chamber 22 will be based on at least one predetermined system activation criterion (for example, the exertion of a predetermined minimum force on a seat belt due to rapid deceleration of a vehicle occupant, or the occurrence or non-occurrence of a test condition). However, in embodiments of the present invention, the deployment or activation of the gas generant in either chamber may be individually and/or collectively controlled based on any of a number of operational factors.

The gas generant material positioned in either first chamber 20 or second chamber 22 may be ignited individually, without igniting the gas generant material in the other chamber. Alternatively, the gas generant material in both of chambers 20 and 22 may be ignited simultaneously, depending on the requirements of a particular application and/or after satisfaction of at least one predetermined system activation criterion.

Alternatively, the gas generant in either chamber may be ignited at a time t, and the gas generant in the other chamber activated at a time t+Δt after ignition of the first-activated gas generant. Stated another way, the gas generant in either chamber 20 or 22 may be ignited first, and then the gas generant in the remaining chamber ignited thereafter. The time lapse between ignition of the gas generant material in one of chambers 20 and 22 and ignition of the gas generant in the other one of chambers 20 and 22 may be determined using any of a variety of known methods and/or criteria. For example, the actual time elapsed between initiation of combustion of the gas generant in one of chambers 20 and 22 and initiation of combustion of the gas generant in the other chamber may be determined based upon at least one predetermined system activation criterion. Alternatively, initiation of combustion of the gas generant in the later-fired gas generant chamber may be dependent upon at least one predetermined system activation criterion.

In a case where the gas generant in chamber 20 is to be activated, upon receipt of an activation signal from a crash sensor or other system activation mechanism (not shown), an electrical activation signal is sent to igniter 44a. Combustion products from the igniter expand into the interior of first tube 34, igniting booster material 45 positioned in the first tube.

Products from the combustion of booster material 45 proceed through openings 28a in divider 18 to ignite gas generant material 48 in first chamber 20. Combustion products such as hot gas, flame, and hot solids proceed through first filter 64, then through gas exit openings 66 into an associated gas-actuatable device (not shown) coupled to the gas generating system.

In a case where the gas generant in chamber 22 is to be activated, upon receipt of an activation signal from a crash sensor or other system activation mechanism (not shown), an electrical activation signal is sent to igniter 46a. Combustion products from the igniter expand into the interior of second tube 38, igniting booster material 47 positioned in the second tube. Products from the combustion of booster material 47 proceed through openings 38a in second tube 38 to ignite gas generant material 58 in second chamber 22. Combustion products such as hot gas, flame, and hot solids proceed through second filter 65, then through gas exit openings 67 into an associated gas-actuatable device (not shown) coupled to the gas generating system.

As such, given a lower weight occupant for example, a single chamber (either 20 or 22) may be selected to singularly operate without simultaneous operation of the other chamber. On the other hand, given a heavier vehicle occupant, chambers 20 and 22 may be selected to simultaneously operate based on seat weight sensor and/or occupant position sensing algorithms known in the art. Either chamber may be selectively operated based on factors such as crash severity, occupant position, the weight and/or height of the occupant and/or other operational factors.

In particular embodiments, the proportion of the gas generant material contained in first chamber 20 is in the range of about 55%-70% by weight of the total quantity of gas generant material, and the proportion of the gas generant material contained in second chamber 22 is in the range of about 30%-45% by weight of the total quantity of gas generant material. The total amount of gas generant and the amount of gas generant in each individual chamber may also be adjusted according to meet the requirements of a given application.

The gas generating system structure and igniter tube arrangement described herein accommodates a relatively greater amount of gas generant material within a given system volume, thereby enhancing system performance and optimizing packaging space.

Figure 3:
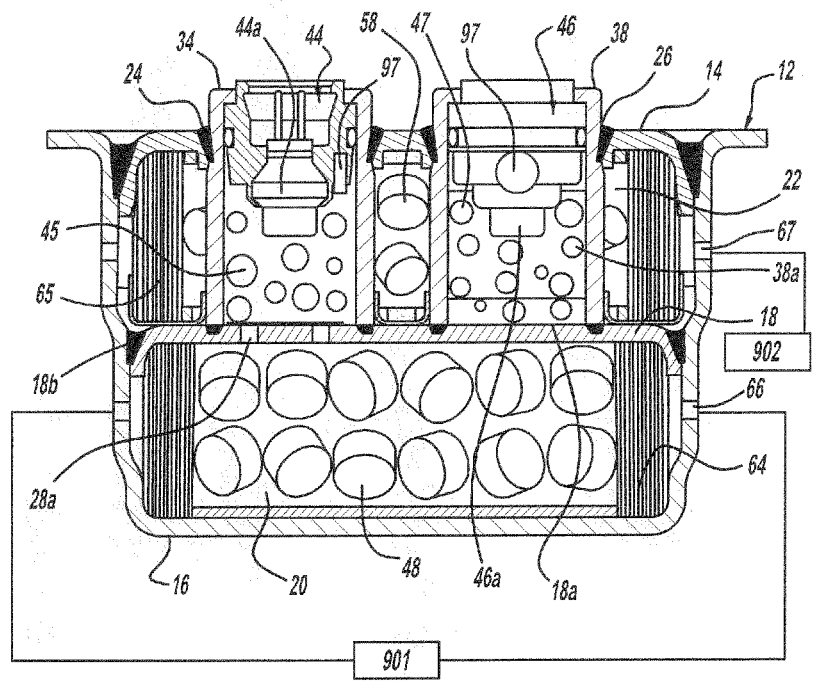
FIG. 3 is a schematic view of a particular application of a gas generating system in accordance with an embodiment of the present invention.

Referring to FIG. 3, in another particular embodiment, housing 12 has at least one first gas exit opening 66 formed therein for enabling fluid communication between the first chamber 20 and a first gas-actuatable device 901 (such as an airbag, for example) located exterior of the housing. Housing 12 also has at least one second gas exit opening 67 formed therein for enabling fluid communication between the second chamber 22 and a second gas-actuatable device 902 located exterior of the housing. In this embodiment, the second gas-actuatable device is separate from the first gas-actuatable device. This enables gases generated by combustion of the gas generant material in each of chambers 20 and 22 to be directed to separate gas-actuatable devices, if desired.

Figure 2:
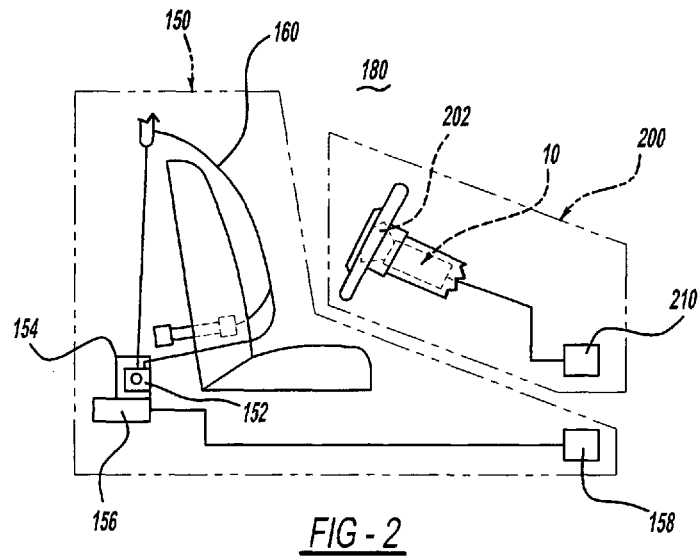
FIG. 2 is a schematic representation of an exemplary vehicle occupant protection system incorporating a gas generating system in accordance with an embodiment of the present invention.

Any embodiment of the gas generating system described herein may be incorporated into an airbag system 200, as seen in FIG. 2. Airbag system 200 includes at least one airbag 202 and a gas generating system 10 in accordance with an embodiment described herein, which coupled to airbag 202 so as to enable fluid communication with an interior of the airbag. Airbag system 200 may also include (or be in communication with) a crash event sensor 210 including a known crash sensor algorithm that signals actuation of airbag system 200.

Referring again to FIG. 2, an embodiment of the gas generating system or an airbag system including an embodiment of the gas generating system may be incorporated into a broader, more comprehensive vehicle occupant restraint system 180 including additional elements such as a safety belt assembly, as seen in FIG. 2. Safety belt assembly 150 includes a safety belt housing 152 and a safety belt 160 in accordance with the present invention extending from housing 152. A safety belt retractor mechanism 154 (for example, a spring-loaded mechanism) may be coupled to an end portion 153 of the belt. In addition, a safety belt pretensioner 156 may be coupled to belt retractor mechanism 154 to actuate the retractor mechanism in the event of a collision. Typical seat belt retractor mechanisms which may be used in conjunction with the safety belt embodiments of the present invention are described in U.S. Pat. Nos. 5,743,480, 5,553,803, 5,667,161, 5,451,008, 4,558,832 and 4,597,546, incorporated herein by reference. Illustrative examples of typical pretensioners with which the safety belt embodiments of the present invention may be combined are described in U.S. Pat. Nos. 6,505,790 and 6,419,177, incorporated herein by reference.

Safety belt system 150 may include (or be in communication with) a crash event sensor 158 (for example, an inertia sensor or an accelerometer) including a known crash sensor algorithm that signals actuation of belt pretensioner 156 via, for example, activation of a pyrotechnic igniter (not shown) incorporated into the pretensioner. U.S. Pat. Nos. 6,505,790 and 6,419,177, previously incorporated herein by reference, provide illustrative examples of pretensioners actuated in such a manner.

It will be understood that the foregoing descriptions of embodiments of the present invention are for illustrative purposes only. As such, the various structural and operational features herein disclosed are susceptible to a number of modifications commensurate with the abilities of one of ordinary skill in the art, none of which departs from the scope of the present invention as defined in the appended claims.

What is claimed is:

1. A gas generating system comprising:
   a housing formed from a first housing portion and a second housing portion;
   a divider dividing an interior of the housing into a first chamber on a first side of the divider and a second chamber on a second side of the divider, the divider having a base portion and a rim extending from the base portion in a first direction and abutting an interior surface of the second housing portion;
   first and second tubes extending from the first housing portion in the first direction into the second chamber and ending at the divider; and
   at least one opening formed in the divider to enable fluid communication between the first and second sides of the divider after activation of the gas generating system wherein all of the openings on the second side of the divider enabling fluid communication between the first and second sides of the divider are positioned within the first tube.

2. The gas generating system of claim 1 further comprising at least one opening formed in the second tube to enable fluid communication of the second chamber with an interior of only the second tube after activation of the gas generating system.

3. The gas generating system of claim 1 wherein the housing includes a first housing portion and a second housing portion operatively coupled to the first housing portion to define the housing interior, and wherein the first and second tubes extend into the housing from the first housing portion to the divider.

4. A vehicle occupant protection system including a gas generating system in accordance with claim 1.

5. An airbag system including a gas generating system in accordance with claim 1.

6. The gas generating system of claim 1 wherein the housing has at least one first gas exit opening formed therein for enabling fluid communication between the first chamber and a first gas-actuatable device located exterior of the housing after activation of the gas generating system, and at least one second gas exit opening formed therein for enabling fluid communication between the second chamber and a second gas-actuatable device located exterior of the housing after activation of the gas generating system, wherein the second gas-actuatable device is separate from the first gas-actuatable device.

7. The gas generating system of claim 1 further comprising a total quantity of gas generant material positioned in the housing interior, and wherein a quantity of gas generant material positioned in the first chamber comprises in the range of about 55%-70% by weight of the total quantity of gas generant material, and wherein a quantity of gas generant material positioned in the second chamber comprises in the range of about 30%-45% by weight of the total quantity of gas generant material.

8. The gas generating system of claim 1 further comprising a quantity of gas generant material positioned in the second chamber exterior of both the first and second tubes.

9. The gas generating system of claim 1 further comprising a quantity of gas generant material positioned in the second chamber surrounding both the first and second tubes.

10. The gas generating system of claim 1 wherein the system is configured such that combustion of the gas generant material in either one of the first chamber and the second chamber may be initiated prior to initiation of combustion of the gas generant material in the other one of the first chamber and the second chamber.

11. The system of claim 1 wherein the rim forms an obtuse included angle with the base portion.

12. A gas generating system comprising:
a housing formed from a first housing portion and a second housing portion defining a housing interior;
a divider dividing the housing interior into a first chamber and a second chamber, the divider having a base portion and a rim extending from the base portion in a first direction and abutting an interior surface of the second housing portion;
first and second igniter tubes extending from the first housing portion in the first direction into the second chamber and ending at the divider;
a first igniter positioned in the first igniter tube and operatively coupled to the first chamber for initiating combustion of a gas generant material only in the first chamber; and
a second igniter positioned in the second igniter tube and operatively coupled to the second chamber for initiating combustion of a gas generant material only in the second chamber, wherein the system is configured to enable ignition of the gas generant in the second chamber without any subsequent ignition of the gas generant in the first chamber.

13. A vehicle occupant protection system including a gas generating system in accordance with claim 12.

14. An airbag system including a gas generating system in accordance with claim 12.

15. The gas generating system of claim 12 wherein the system is configured such that combustion of the gas generant in one of the first chamber and the second chamber may be initiated substantially simultaneously with initiation of combustion of the gas generant in the other one of the first chamber and the second chamber.

16. The gas generating system of claim 12 wherein the system is configured such that combustion of the gas generant in one of the first chamber and the second chamber may be initiated after initiation of combustion of the gas generant in the other one of the first chamber and the second chamber.

17. The gas generating system of claim 16 wherein combustion of the gas generant in the one of the first chamber and the second chamber is initiated when a predetermined amount of time has elapsed after initiation of combustion of the gas generant in the other one of the first chamber and the second chamber.

18. The gas generating system of claim 16 wherein initiation of combustion of the gas generant in the one of the first chamber and the second chamber is dependent upon at least one predetermined system activation criterion.

19. The gas generating system of claim 16 wherein an amount of time elapsed between initiation of combustion of the gas generant in the one of the first chamber and the second chamber and initiation of combustion of the gas generant in the other one of the first chamber and the second chamber is determined based upon at least one predetermined system activation criterion.

20. The gas generating system of claim 12 wherein the divider includes at least one opening to enable fluid communication between opposite sides of the divider, the at least one opening on a side of the divider on which the igniter tubes are positioned being enclosed within the first tube such that fluid communication in the housing interior between the opposite sides of the divider can only occur through the at least one opening.

* * * * *

UNITED STATES PATENT AND TRADEMARK OFFICE
CERTIFICATE OF CORRECTION

| | | |
|---|---|---|
| PATENT NO. | : 8,282,127 B1 | Page 1 of 1 |
| APPLICATION NO. | : 12/584369 | |
| DATED | : October 9, 2012 | |
| INVENTOR(S) | : Morgan et al. | |

It is certified that error appears in the above-identified patent and that said Letters Patent is hereby corrected as shown below:

Col. 3, Line 20; Delete "by" and Insert --bv--.

Signed and Sealed this
Eighteenth Day of December, 2012

David J. Kappos
*Director of the United States Patent and Trademark Office*